(12) United States Patent
LaBonte et al.

(10) Patent No.: US 10,549,564 B2
(45) Date of Patent: Feb. 4, 2020

(54) SUBLIMATION OVER PRINT

(71) Applicant: NIKE, Inc., Beaverton, OR (US)

(72) Inventors: Louie LaBonte, Portland, OR (US); Scott Mon, Portland, OR (US); Tiffany Peterson, Beaverton, OR (US)

(73) Assignee: NIKE, Inc., Beaverton, OR (US)

(*) Notice: Subject to any disclaimer, the term of this patent is extended or adjusted under 35 U.S.C. 154(b) by 0 days.

(21) Appl. No.: 15/990,930

(22) Filed: May 29, 2018

(65) Prior Publication Data
US 2018/0345707 A1 Dec. 6, 2018

Related U.S. Application Data

(60) Provisional application No. 62/513,087, filed on May 31, 2017.

(51) Int. Cl.
*D06P 5/00* (2006.01)
*B41M 5/035* (2006.01)
(Continued)

(52) U.S. Cl.
CPC ....... *B41M 5/0358* (2013.01); *B41F 16/0046* (2013.01); *B41J 2/325* (2013.01); *B41J 3/407* (2013.01); *C09D 11/34* (2013.01)

(58) Field of Classification Search
CPC ..... B41J 2/01; B41J 3/407; B41J 2/325; B41J 3/4078; C09D 11/34; D06P 5/002;
(Continued)

(56) References Cited

U.S. PATENT DOCUMENTS 3,775,046 A 11/1973 Harper, Jr. et al.
4,021,591 A 5/1977 DeVries et al.
(Continued)

FOREIGN PATENT DOCUMENTS

AU 2014201839 B1 4/2015
JP S53126373 A 11/1978
(Continued)

OTHER PUBLICATIONS

"Category Archives: Dye Sublimation T Shirt Printing," Contract Screen Printing, contractscreenprinting.biz, Sep. 10, 2014. 22 pages. <http://www.contractscreenprinting.biz/category/dye-sublimation-t-shirt-printing/page/2/>.

(Continued)

*Primary Examiner* — Eisa B Elhilo
(74) *Attorney, Agent, or Firm* — Shook, Hardy & Bacon, L.L.P.

(57) ABSTRACT

Aspects are directed to printing a garment and include a method having steps of providing a fabric panel containing polyester, applying an ink layer to a first area of the fabric panel, curing the ink layer, and applying a sublimation dye to the first area and a different second area of the fabric panel. Application of the sublimation dye causes the first area and the second area to have different color saturations. Other aspects include a garment with a fabric panel containing polyester that has a first surface with a first area and a different second area. The garment also includes an ink layer on the first surface and located at the first area and a sublimation dye absorbed by a portion of the fabric panel at the second area and on a surface of the ink layer at the first area.

20 Claims, 5 Drawing Sheets

(51) Int. Cl.
*B41F 16/00* (2006.01)
*B41J 2/325* (2006.01)
*B41J 3/407* (2006.01)
*C09D 11/34* (2014.01)

(58) Field of Classification Search
CPC ... D06P 5/004; D06P 5/12; D06P 5/30; D06C 23/00
See application file for complete search history.

(56) References Cited

U.S. PATENT DOCUMENTS

| | | |
|---|---|---|
| 4,072,462 A | 2/1978 | Vellins et al. |
| 4,242,093 A | 12/1980 | Gasperini et al. |
| 4,541,340 A | 9/1985 | Peart et al. |
| 4,576,610 A | 3/1986 | Donenfeld |
| 4,774,885 A | 10/1988 | Chmielnik |
| 5,160,505 A | 11/1992 | Seveno et al. |
| 5,360,456 A | 11/1994 | Lecomte et al. |
| 6,651,551 B1 | 11/2003 | Castellanos |
| 7,674,747 B1 | 3/2010 | Long |
| 8,485,657 B2 | 7/2013 | Pinto et al. |
| 8,512,420 B2 | 8/2013 | Genisot et al. |
| 8,647,740 B2 | 2/2014 | He et al. |
| 8,735,320 B2 | 5/2014 | La Costa |
| 9,186,903 B2 | 11/2015 | McClard et al. |
| 9,345,270 B2 | 5/2016 | Owen et al. |
| 9,348,069 B2 | 5/2016 | Liles et al. |
| 9,408,426 B2 | 8/2016 | Middo et al. |
| 2005/0248649 A1 | 11/2005 | Farrell et al. |
| 2006/0023292 A1 | 2/2006 | Simone, Jr. |
| 2007/0163057 A1 | 7/2007 | Bertele et al. |
| 2009/0034012 A1 | 2/2009 | Northup et al. |
| 2011/0289647 A1* | 12/2011 | Chiao .................. B32B 7/12 2/69 |
| 2013/0263352 A1 | 10/2013 | Crockett, Jr. |

FOREIGN PATENT DOCUMENTS

| | | |
|---|---|---|
| WO | 9910183 A1 | 3/1999 |
| WO | 2004106082 B1 | 1/2005 |
| WO | 2016016757 A1 | 2/2016 |

OTHER PUBLICATIONS

Jerry, "Decorating Dark Garments with EnduraTex SubliTex Heat Transfer Film," Sign Warehouse, signwarehouse.com, Jun. 29, 2013. 2 pages. <https://web.archive.org/web/20130629131541/http://www.signwarehouse.com/blog/enduratex-sublijet/>.

"Minimalist Leprechaun St. Patrick's Day All Over Print Sublimation Mens T-shirt," Be Wild, bewild.com, accessed: Aug. 2016. 3 pages. <http://www.bewild.com/leprechaun-sublimation-mens-t-shirt.html>.

"All Over, Full Color Shirts," Jak Prints, jakprints.com, Sep. 14, 2010. 4 pages. <https://web.archive.org/web/20100914143505/http://www.jakprints.com/all-over-shirt-printing>.

Wei, Yang, et al., "Screen printing of a capacitive cantilever-based motion sensor on fabric using a novel sacrificial layer process for smart fabric applications," Measurement Science and Technology 24.7 (2013): 075104. 3 pages. <http://iopscience.iop.org/article/10.1088/0957-0233/24/7/075104/meta>.

Nabil A Ibrahim et al: "Improving transfer printing and ultraviolet-blocking properties of polyester-based textiles using MCT-[beta]-Cd, chitosan and ethylenediamine", Coloration Technology, Wiley, vol. 126, No. 6, Dec. 1, 2010 (Dec. 1, 2010), pp. 330-336, XP001585171. ISSN: 1472-3581, DOI:10.1111/J.1478-4408.2010.00265.X [retrieved on Oct. 18, 2010].

* cited by examiner

SUBLIMATION OVER PRINT

CROSS-REFERENCE TO RELATED APPLICATIONS

This application, having U.S. application Ser. No. 15/990,930, filed on May 29, 2018, and entitled "Sublimation Over Print," claims the benefit of priority of U.S. Provisional Application No. 62/513,087, filed on May 31, 2017, and entitled "Sublimation Over Print." The entirety of U.S. Provisional Application No. 62/513,087 is incorporated by reference herein.

STATEMENT REGARDING FEDERALLY SPONSORED RESEARCH OR DEVELOPMENT

Not applicable.

TECHNICAL FIELD

Sublimation dyeing a material over at least a portion having ink on a surface of the material.

BACKGROUND

In the past, garments were constructed from one or more basic materials that were typically selected based on durability, availability, cost, and manufacturing limitations. Besides providing warmth, and/or protection, these materials usually did not afford garments any specific qualities. Nowadays, garments are constructed from a variety of materials that may be chosen to give a particular item of apparel desirable characteristics. One such example is athletic garments, which may be composed of blends of materials that contain polyester and a combination of other materials including nylon, rayon, cotton, cellulose, and the like. Generally, these blends are referred to as "polyester blends" and are used to make garments with performance characteristics that are ideal for athletic activities such as minimal weight, increased elasticity, and/or moisture control.

BRIEF DESCRIPTION OF THE DRAWINGS

The present invention is described in detail herein with reference to the attached drawing figures, wherein.

DETAILED DESCRIPTION

Figure 1:
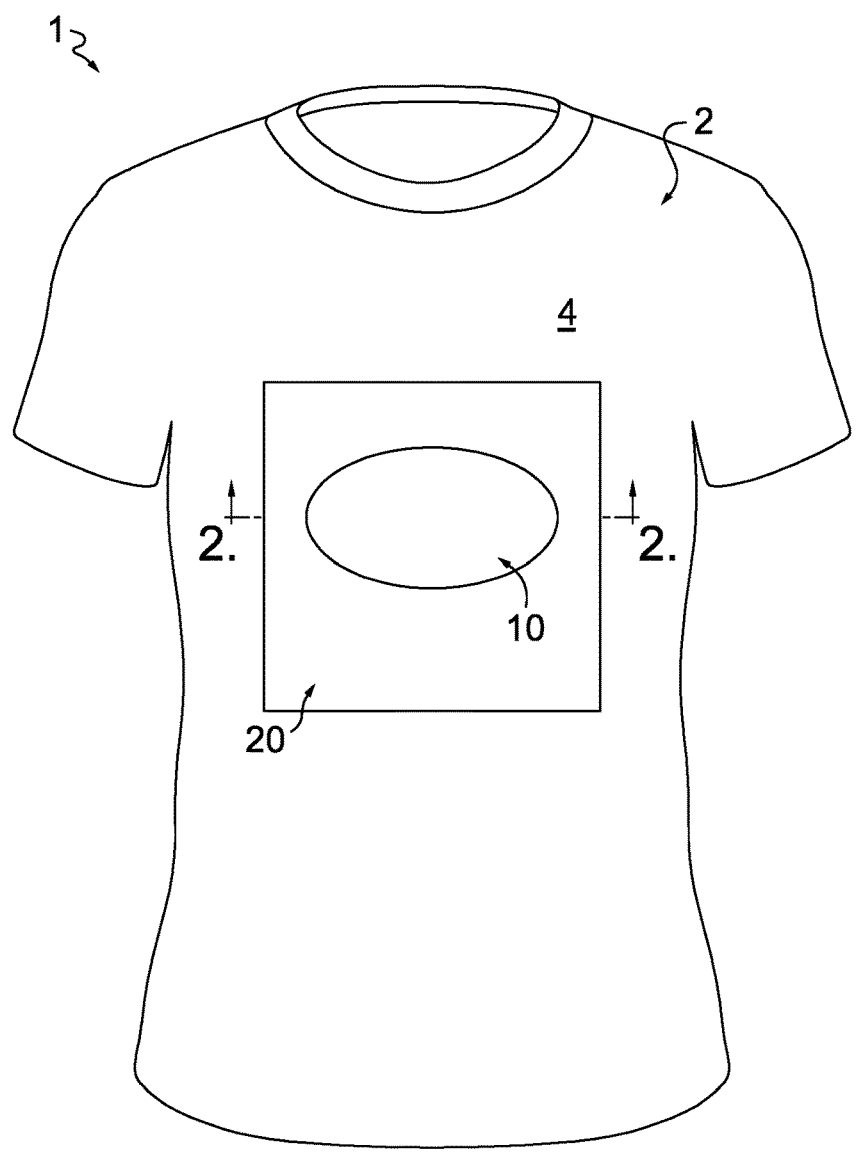
FIG. 1 depicts a top view of an example garment, in accordance with an aspect hereof.

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Aspects hereof provide methods for applying an ink layer and a sublimation dye to a first surface of a fabric panel made of at least 50% polyester. The ink layer is applied to a first area of the first surface via a direct printing method, and the ink may be polyurethane-based or non-polyurethane based. The sublimation dye is applied to both the fabric panel and the ink such that is the sublimation dye is applied at a second area of the first surface of the fabric panel and on a distal surface on the ink layer relative to the fabric panel. Application of the sublimation dye causes the first area to have a first color saturation and the second area to have a different second color saturation.

Further aspects provide a garment or material comprising a fabric panel made of at least 50% polyester, an ink layer, and a sublimation dye. The fabric panel has a first surface, a first area on the first surface and, a second area on the first surface. Moreover, the ink layer is located at the first area on the first surface and has an ink surface distal to the fabric panel on the first surface. The sublimation dye is located at the first area and the second area of the fabric panel and is absorbed by at least a portion of the fabric panel at the second area and is on at least the distal ink surface at the first area.

Polyester blend fabrics may not be traditionally compatible with conventional printing methods, and as a result, the use of polyester blends in garments/materials can impose limitations on traditional printing.

In part, this is attributable to an association between previous printing methods and a specific material or fabric. Often times, printing methods implement certain steps and components that are most suitable for achieving a desired result in connection with a particular material or fabric. For instance, screen printing is commonly used for printing cotton fabrics and involves applying a liquid-based ink to a surface of the cotton fabric and then curing the liquid-based ink. Because the cotton fabric is somewhat hydrophilic and does not repel water, the liquid-based ink adheres to the surface upon curing, resulting in a durable print. Conversely, screen printing other fabrics may produce an inferior print in comparison and may from an inconsistent ink film layer on the surface of the fabric, which may result in the print having poor aesthetic qualities. Further, the ink film layer may act as a barrier between a wearer and the fabric that affects moisture control properties of a fabric.

Previous attempts to overcome these shortcomings included printing additional layers of the liquid-based ink or pretreatment layers in an effort to form a more consistent ink layer. Even though this may help improve aesthetic qualities of a print, the additional layers of ink or pretreatments created a thicker barrier that further reduced moisture control properties. Moreover, the additional ink and pretreatment layers caused the fabric to be stiff and weighed down, which also adversely impacted performance characteristics of athletic garments.

Other attempts included implementing or developing alternative ways to print fabrics that contain polyester, such as sublimation printing, which produces a print by heat-transferring sublimation dyes throughout a fabric as opposed to layering inks onto a fabric's surface. In addition, sublimation dyes have an affinity to polyester and may be absorbed by a polyester material, and thus, sublimation printing dyes a polyester portion of a fabric. Sublimation dyes essentially become part of the fabric itself and have minimal, if any, effects on a structure of the fabric and do not adversely impact performance characteristics. As such, sublimation printing is typically used to print fabrics that are 100% polyester or have a high polyester content. Nevertheless, sublimation dyes do not have an affinity to non-polyester materials, such as cotton and are not readily absorbed by non-polyester portions of a fabric. As a result, aesthetic qualities of a print have a direct relationship with an amount of polyester material contained in a fabric. Consequently, using sublimation printing to print fabrics made of a blend of materials that do not have a high polyester content, such as polyester blend fabrics, produces a print that is muted or faded and has poor aesthetic qualities.

In sum, traditional printing methods fail to provide solutions to the problems associated with printing polyester blend fabrics, and any prior attempts to solve these problems have failed and frequently produce undesirable side effects. Aspects described herein overcome these shortcomings and provide solutions for producing a print with improved aesthetic qualities on a garment made of a polyester blend fabric without adversely impacting performance characteristics of the garment.

Aspects hereof provide methods directed to printing a garment and include application of an ink and a sublimation dye to a fabric panel to cause a first saturation and a second saturation at different areas of the fabric. At a first step of the method, a fabric panel is provided and comprises at least 50% polyester and has a first surface with a first area and a second area. Next, a layer of ink is applied to the first area of the first surface by direct printing. In some aspects, a polyurethane-based ink may be used to form the ink layer and in other aspects, a non-polyurethane-based ink may be used. The ink layer is then cured through traditional curing techniques, which may include heat treatments and may vary depending on the ink that is used. Subsequent to curing, a sublimation dye is applied to the second area of the first surface and a surface of the ink layer that is positioned distal to the first surface of the fabric panel. Further, steps and components of the method are configured such that application of the sublimation dye causes the first area to have a first color saturation and the second area to have a different second color saturation.

Additional aspects provide a garment comprising a fabric panel made of at least 50% polyester, an ink layer, and a sublimation dye. The fabric panel has a first surface with a first area and a second area. The ink layer is located at the first area on the first surface and has an ink surface distal to the fabric panel on the first surface, and the sublimation dye is located at the first area and the second area of the fabric panel and is absorbed by at least a portion of the fabric panel at the second area and is on at least the ink surface at the first area.

As will be evident hereinafter, aspects herein may be utilized to produce a higher quality print on a garment made of a polyester blend fabric than was previously attainable. More particularly, an ink and a sublimation dye with certain characteristics may be applied to a fabric panel of at least 50% polyester via certain printing techniques to produce a print with varying color saturation. Further, a color saturation at one printed area of a garment may have a different color saturation than another printed area, which causes these areas to contrast with one other, and as a result, a garment may include a print with improved aesthetic qualities. In addition, utilizing these aspects produces a print on a garment without impacting characteristics afforded by the garment's material or fabric.

As will be discussed throughout, it is contemplated that aspects provided herein are directed to methods for printing a garment and are also directed to a garment, which may or may not be printed by the provided methods. Many aspects relate to both the methods for printing a garment and the garment itself, and therefore, some aspects may be described in differing manners depending on context. For instance, an ink may be referred to as an ink layer when applied to a fabric panel or may be referred to as a layer of ink that has been applied to a fabric panel. Regardless, aspects described in connection with an ink are applicable to an ink layer and a layer of ink before, during, and after application. Accordingly, contextual descriptions of any aspects provided herein are not limiting to the scope of applicability for any claimed aspects.

Figure 5:
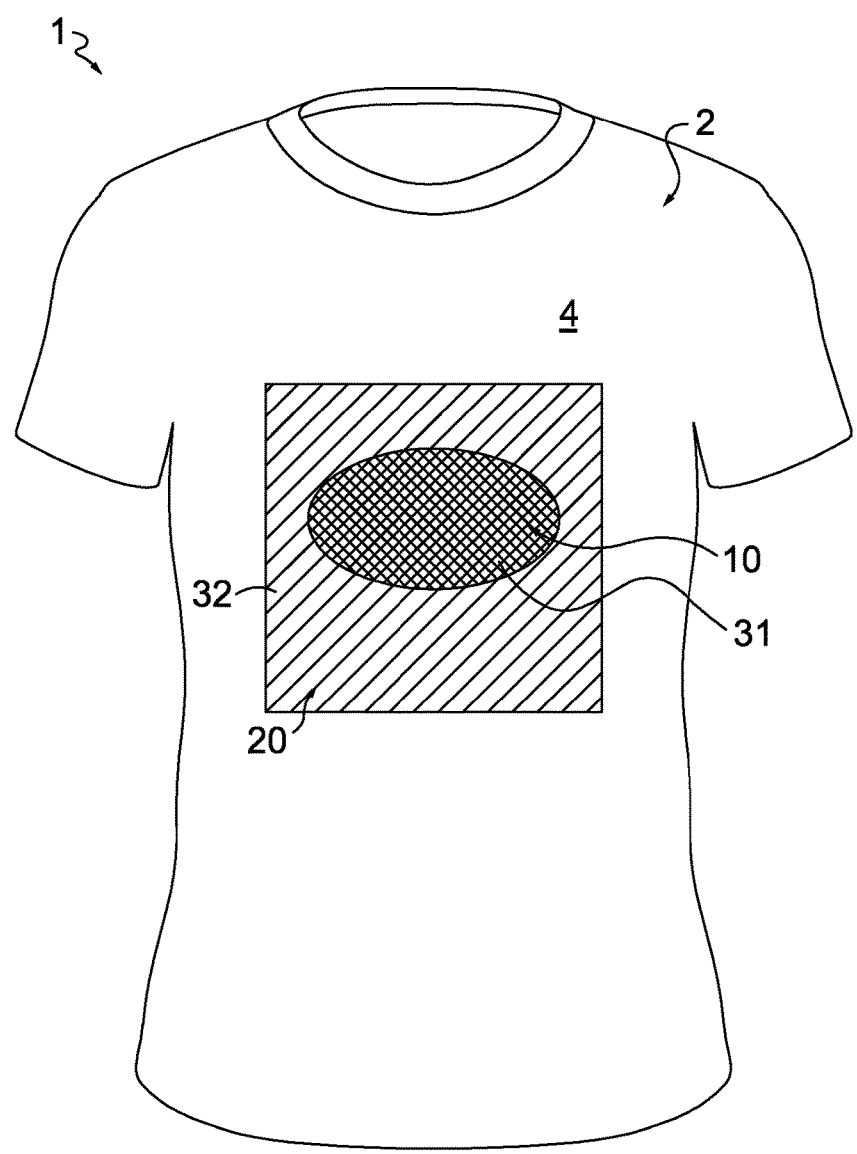
FIG. 5 depicts a top view of the garment of FIG. 1, illustrating a first color saturation and a different second color saturation, in accordance with an aspect hereof.
Figure 6:
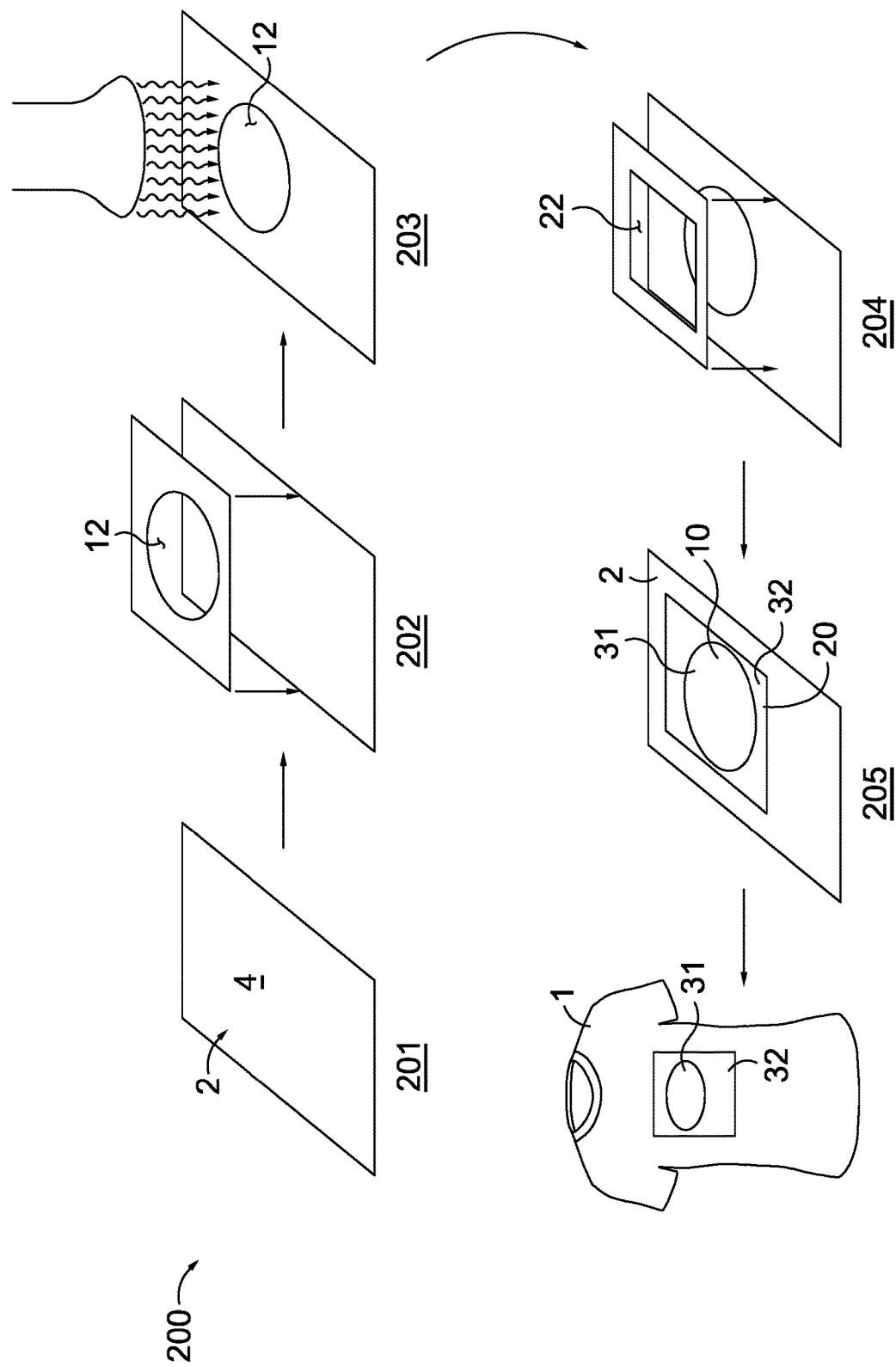
FIG. 6 illustrates an example method of applying an ink and a sublimation dye to a fabric panel, in accordance with an aspect hereof.

Further, aspects and components herein may be presented in a simplified fashion for example purposes but in practice, are more complex. For example, a garment is described as having a fabric panel and is shown in FIGS. 1, 5, and 6 as a shirt. Nonetheless, it is contemplated herein that a garment may comprise one or more individual parts, like a fabric panel, that may be joined together using a variety of adhesives, stitches, and other types of joining/bonding components to produce any article of apparel including, but not limited to, sweatshirts, tank tops, shorts, pants, jackets, socks, leg sleeves, arm sleeves, headbands, and the like.

In a similar manner, a fabric panel may be described as a component of a garment, but a fabric panel may be one of several components that may form any type of garment and may comprise a variety of materials and other characteristics. Generally, a fabric panel may be cut from a larger piece of material having two opposing surfaces, and minimal thickness. Thus, both sides of a fabric panel have a surface area, and a fabric panel may comprise a first surface, a first area on the first surface, and a second area on the first surface. Furthermore, certain features of a fabric panel may be based on a fabric panel's role in construction of a particular garment, and therefore, a size or material composition of a fabric panel may vary depending on requirements of the particular garment. Such aspects are later discussed in detail.

In other aspects, it is contemplated that a fabric panel may be a formed-to-shape material, such as a knit, woven, braided, non-woven material that is formed in a generic shape or in a specific shape, such as a shape of the fabric panel. Further, while discussion herein refers to a garment, it is understood that methods and techniques provided herein are applicable to other articles, such as footwear, equipment, and other articles formed with a polyester-based material. Therefore, it is contemplated that the term "garment" may be replaced with a generic term "article" throughout while maintaining the intended scope hereof. However, for discussion purposes, the term "garment" is generally used for illustrative purposes.

As will be evident hereinafter, aspects directed toward an ink, a sublimation dye, and their application to a fabric panel include a variety of features and components. Broadly, an ink includes any ink compatible with direct printing that forms a layer of the ink on a surface of a fabric panel, and a sublimation dye includes any dye compatible with sublimation printing that impregnates the dye in at least a portion of a fabric panel and an ink layer. Moreover, primary distinctions between an ink and a sublimation dye include composition, color and/or visual components, compatibility with printing techniques, application to a fabric panel, and interactions with each other and a material of a fabric panel. These differences inherently involve individual aspects of both an ink and a sublimation dye and are subsequently discussed in more detail, but such differences are better appreciated with a basic understanding of an ink and a sublimation dye. Thus, initial explanations of an ink and a sublimation dye are provided immediately below.

The term "an ink(s)" is used throughout this description and in the claims to refer to a liquid or paste that is applied to and positioned on a surface of a substrate via direct printing. The liquid or paste may be a medium having one or more components including, but not limited to, solvents, colorants such as pigments, resins, lubricants, solubilizers, surfactants, particulate matter, fluorescents, and other materials, any or all of which may be included to affect various properties of the ink. In addition, "an ink" may be utilized in accordance with aspects provided herein to form "an ink layer" or "a layer of ink," and therefore, it is to be understood that any aspects, definitions, or descriptions related to "an ink" are imparted to and applicable to "an ink layer" or "a layer of ink." Accordingly, the terms "an ink layer" or "a layer of ink" are used throughout this description and in the claims to refer to "an ink" that has been utilized in connection with methods for printing a garment or as a component of a garment.

Further, the term "sublimation dye(s)" is used throughout this description and in the claims and refer to a colored substance that has an affinity to a substrate and is applied to the substrate via sublimation printing. The colored substance may be derived from plant or synthetic sources that may be finely ground and included with a dispersing agent. The sublimation dye may infuse into the substrate at the molecular level and impregnate color into a material. Moreover, "sublimation dye" may be utilized in accordance with aspects provided herein to be absorbed by a fabric panel and to be on at least an ink surface, and it is to be understood that any aspects, definitions, or descriptions related to a "sublimation dye" are also applicable to utilization of a "sublimation dye" in connection with methods for printing a garment and as a component of a garment.

As initial explanations of an ink and a sublimation dye have been provided, more detailed aspects of both will now be discussed. Beginning with an ink, it is contemplated that an ink layer may be formed by using direct printing to apply an ink to a surface of a fabric panel, and as such, aspects related to an ink involve direct printing and a composition of an ink that affords the ink various properties, both of which affect how the ink interacts with a fabric panel and a sublimation dye. These aspects are discussed in this order in the following paragraphs.

An ink includes any ink that is compatible with and suitable for direct printing. At a high level, direct printing includes printing techniques that transfer an ink onto a surface of a substrate and may involve a curing step that promotes adhesion between the ink and the surface of the substrate. Further, these printing techniques involve applying an ink to a limited area of a surface of a substrate and may be applied such that the ink forms a graphic or an image on the substrate at the applied area. Known printing techniques that may be implemented as direct printing include, but are not limited to, screen printing, rotary printing, direct to garment digital printing, and combinations of these techniques, such as hybrid printing technique that includes aspects of both screen printing and direct to garment digital printing.

In aspects, direct printing an ink onto a surface of a fabric panel is performed via screen printing. Aspects related to screen printing include use of one or more screens to transfer an ink onto an area of a surface of a fabric panel to form a print. The screen may include a blocking stencil that prevents transfer of the ink to the fabric panel at any blocked area. A device such as a blade or squeegee may be used to transfer the ink through the screen and onto the surface of the fabric panel. A screen may be constructed from a mesh stretched over a frame, and in use, the mesh may be mounted on a frame and may be under tension. In some aspects, a stencil may be formed by blocking off parts of the screen in the negative image of an image, graphic, design, or visual indicia to be printed, or stated differently, the ink may be applied to the fabric panel at open spaces of the screen.

During printing, the screen may be placed atop the fabric panel, and the ink may be placed on top of the screen via a fill bar or other mechanism that may fill mesh openings in the screen with the ink and to move the ink to the front of the screen, which is nearest to the fabric panel. A squeegee, blade or similar device may then be used to pump or squeeze the ink by capillary action onto the surface of the fabric panel in a controlled and prescribed amount, and as the squeegee moves toward a rear of the screen, tension may pull the screen away from the fabric panel leaving the ink on the surface of the fabric panel. In further aspects, one ink is printed onto the fabric panel at a single time and produces one ink layer on the surface of the fabric, and a same or additional screens may be used to produce additional ink layers, which may be formed by printing the same ink or another ink.

Accordingly, it is contemplated that an ink includes a wide range of inks compatible with one or more of the foregoing printing techniques. Generally, these inks are liquid-based and have one or more components that impart certain characteristics to a fabric or material, and such inks include, but are not limited to, cracking ink, discharge ink, glitter or shimmer ink, gloss ink, metallic ink, mirrored silver ink, plastisol ink, polyvinyl chloride ink (PVC-ink), non-PVC ink, phthalate ink, non-phthalate ink, acrylic ink, suede ink, oil-based inks, water-based inks, and combinations thereof. Moreover, any of these inks may include additives, which may be added to promote or mask a certain property, and examples of additives that may be used include, but are not limited to, polyurethane, polyester flakes, polyvinyl, and substitutable equivalents thereof that are known by those in the art to promote or inhibit compatibility with a sublimation dye.

As mentioned, the ink may have one or more components that may be configured to impart one or more characteristics to an area of a fabric or material printed with the ink, and such aspects may include visual and tactile characteristics. Accordingly, it is contemplated that an ink may have a color component, which may be afforded by a pigment or other colorants. As such, an ink may be configured to be of any color including red, orange, yellow, green, blue, indigo, violet, shades thereof. Moreover, it is further contemplated that an ink may have other visual components that may be configured such that an ink may be reflective, metallic, clear, white, black, or colorless. Further, a color component and/or a visual component of an ink may be maintained during and after application of the ink to onto a surface a fabric panel, and therefore, a color component and/or a visual component of an ink that was applied to a surface of a fabric panel is imparted thereto.

As evidenced by the foregoing, aspects herein contemplate using a variety of inks, which may have differing compositions and may also include one or more additives. In order to aid in explanation and to more clearly communicate the present aspects, inks contemplated herein are separated into two categories based on a polyurethane content of an ink. Therefore, the term "polyurethane-based ink" is used throughout this description and in the claims and shall refer to any ink described herein that contains polyurethane. The term "non-polyurethane-based ink" is used throughout this description and in the claims and shall refer to any ink described herein that does not contain polyurethane. Moreover, although inks may have similar characteristics and properties, a primary distinction among the inks is whether an ink composition includes polyurethane or a substitutable equivalent, such as polyester flakes, polyvinyl, or other polymers capable of providing an ink characteristics and properties similar to those afforded by polyurethane. Therefore, it is contemplated that a polyurethane-based ink could be a variety of inks, such as water-based inks or solvent-based inks. It is further contemplated that a non-polyurethane-based ink could be a variety of inks, such as acrylic-based inks. Additionally, it is contemplated that polyurethane and non-polyurethane-based inks suitable for use in accordance with aspects herein include many inks that are commercially available from Magna Colours Limited.

In further aspects, a polyurethane content of an ink may affect how the ink interacts with a sublimation dye. As such, a polyurethane-based ink may be configured to absorb or otherwise create an affinity with a sublimation dye, while a non-polyurethane-based ink may be configured to resist and prevent absorption of a sublimation dye. These aspects further involve a composition of a sublimation dye and will be more easily understood after a sublimation dye is discussed. Therefore, such aspects are described in greater detail below.

Turning now to aspects related to a sublimation dye, it is contemplated that a sublimation dye may include any sublimation dye that may be applied to a fabric panel and a surface of an ink layer by using sublimation printing in accordance with aspects discussed herein. As such, a sublimation dye may include aspects related to properties that involve a compatibility and suitability with sublimation printing and a manner in which the sublimation dye interacts with a fabric panel and an ink.

Beginning with aspects related to sublimation printing, it is contemplated herein that a sublimation dye includes dyes compatible with sublimation printing. As is understood by those having ordinarily skill in the art, sublimation printing utilizes the science of sublimation, in which heat and pressure are applied to a solid, turning it into a gas through an endothermic reaction without passing through the liquid phase. At a high level, sublimation printing may include solid, heat-sensitive dyes, dissolved in a liquid that, when under heat and pressure, change into gas, bond with a compatible substrate, and then change back into a solid. As a result, sublimation dyes are infused into a substrate at the molecular level, rather than being applied on a surface of a substrate. Accordingly, sublimation printing as discussed herein contemplates any sublimation printing technique that accomplishes the foregoing aspects.

As will be evidenced by the following, sublimation printing techniques may utilize a variety of components and techniques to apply a sublimation dye to a fabric panel, and different sublimation printing techniques may include similar and/or different aspects. For example, one sublimation printing technique may apply a sublimation dye to a fabric panel differently than another, but these same sublimation printing techniques may include a sublimation printer and may also use heat or energy to cause absorption of a sublimation dye by a fabric panel. Thus, certain aspects may be applicable to one or more sublimation printing techniques discussed herein, and as such, it is contemplated that any such aspects may be utilized in a variety of manners to apply a sublimation dye to a fabric panel.

Accordingly, sublimation printing techniques may include a sublimation printer configured to apply a sublimation dye to a variety of substrates. Aspects herein contemplate a sublimation printer configured to apply a sublimation dye to a transfer sheet, a fabric panel, an ink layer, and in further aspects, a sublimation printer may be configured to apply a sublimation dye to textile substrates, fabric substrates, and rigid substrates having polymer treatments that are used to construct common everyday items. As understood by those having ordinary skill in the art, a sublimation printer may further be configured to transfer one or more sublimation dyes onto a given substrate by utilizing a variety of components and techniques. For instance, a sublimation printer may include one or more dye sublimation ribbons that store one or more sublimation dyes and during printing, release or transfer the one or more sublimation dyes. In some aspects, print rollers may move a dye sublimation ribbon into contact with a substrate under a thermal printing head that may apply heat, which causes a sublimation dye to be transferred from the sublimation ribbon to the contacted substrate. In even further aspects and as also understood by those having ordinary skill in the art, sublimation printing techniques may utilize digital printing technology. Generally, such aspects involve using a computer and computer software with a sublimation printer to print a digital image onto a substrate, and it is contemplated that any digital printing technology known by those having ordinary skill in the art may be used with aspects herein including those related to sublimation printing methods and techniques.

In some aspects, sublimation printing a sublimation dye on a fabric panel may be performed by first applying a sublimation dye to a transfer sheet via a sublimation printer and then applying the printed transfer sheet to the fabric panel via a heat press in a manner that causes the sublimation dye to transfer and absorb into to the fabric panel. In other aspects, sublimation printing a sublimation dye on a fabric panel may be performed by applying a sublimation dye to a fabric panel via a sublimation printer and then heating the printed fabric panel in a manner that cause the sublimation dye to be absorbed in the fabric panel. In order to aid in explanation and to more clearly communicate these aspects, sublimation printing techniques contemplated herein are categorized based on whether a sublimation printing technique includes a transfer sheet or equivalent thereof. As such, sublimation printing techniques that include a transfer sheet are referred to as "transfer sublimation printing" and those that do not include a transfer sheet are referred to as "direct sublimation printing."

Aspects related to transfer sublimation printing include applying sublimation dyes to a transfer sheet using a heat transfer, and in other aspects, the sublimation dyes may be applied to a transfer sheet using an ink jet printer. In either aspect, the transfer sheet is then be applied to a fabric panel with a heat press under high heat, in an approximate range of 325-375 F, for around 45 seconds, in an exemplary, non-limiting aspect. While 45 seconds is provided, it is contemplated that the heat press may be applied for any amount of time, such as 30 seconds to 1 minute, in another non-limiting example. As a result, the sublimation dyes are transferred from the transfer paper to the fabric panel and are absorbed by a polyester portion of the fabric panel and/or an ink layer that was previously printed on the fabric panel. In aspects related to direct sublimation printing, sublimation dyes may be applied directly to a fabric panel with a digital printer. The fabric panel may then be heated to a temperature in an approximate range of 325-375 F in an exemplary, non-limiting aspect to cause the sublimation dyes to be absorbed by a polyester portion of the fabric panel and/or an ink layer included on the fabric panel.

In accordance with these aspects, it is contemplated that a sublimation dye compatible with sublimation printing may be used, and therefore, a sublimation dye includes multiple dyes that are compatible with the foregoing sublimation printing techniques. Generally, a sublimation dye may include any dye that may be used to dye polyester, such as disperse dyes or solvent dyes, that is capable of sublimation. Moreover, a sublimation dye may include a solid, heat-sensitive dye, dissolved in liquid that changes into a gas under heat and pressure. Further, once in a gaseous state, the sublimation dye bonds with a compatible substrate, and afterward, upon removal of the heat and pressure, the sublimation dye changes back into a solid state. In some aspects, a sublimation dye may have solid particles suspended in a liquid to permit flow of the sublimation dye through sublimation printers, and in further aspects, a sublimation dye may have an affinity to polymers, such as polyester. Additional aspects relate to a sublimation dye having a color component, which may be afforded by colorants, and a sublimation dye may be configured to be of any color including red, orange, yellow, green, blue, indigo, violet, shades thereof. It is further contemplated that a color component of a sublimation dye may be imparted to a fabric panel and/or at least a portion of an ink layer previously printed on a surface of the fabric panel.

The foregoing aspects, as well as any other applicable aspects discussed herein, that relate to an ink, a sublimation dye, direct printing techniques and sublimation printing techniques are not limited to those presently known in the art. It is contemplated that any ink, sublimation dye, or printing technique may be utilized in accordance with aspects described herein to produce similar or desirable results, regardless of whether an ink, sublimation dye, or printing technique is currently available or has yet to be developed. For instance, any ink, sublimation dye, or printing technique may be implemented or substituted as long as a suitable garment may be printed in accordance with the aspects discussed herein.

As previously stated, aspects herein relate to a fabric panel that may form at least a portion of a garment, and as such, a fabric panel may be any textile or cloth material formed of natural or artificial fibers. Moreover, it is contemplated herein that a fabric panel may be formed by traditional methods such as weaving, knitting, crocheting, knotting, felting, and the like. In aspects, a material of a fabric panel is configured to interact with an ink and a sublimation dye such that a high quality graphic, design, image, or visual indicia may be printed on the fabric panel.

Additionally, a fabric panel may comprise one or more materials that are suitable for or provide desirable characteristics to a specific garment including breathable materials, wicking fabrics, stabilizing components, and/or elastic elements for comfort and/or tailoring a fit of a garment. As such, a fabric panel may comprise polyester, nylon, cotton, spandex, rayon, cellulose, and blends thereof. In aspects, these materials may be included in a fabric panel in certain amounts, and for example, a fabric panel may comprise a blend of materials. These aspects include a fabric panel formed from a material that comprises at least 50% polyester, and thus, a composition of fibers that form the material may include at least 50% polyester fibers. Such aspects further contemplate using a performance fabric or a polyester blend fabric to form a fabric panel, both of which include at least 50% polyester and provide performance characteristics for garments designed to be worn by a wearer participating in athletic activities. In some aspects, a fabric panel may be composed of 75% polyester and 25% cellulose, cotton, and rayon; 50% polyester and 50% cellulose; or 100% polyester.

As discussed, aspects relate to employing an ink and a sublimation dye to print a garment formed of a fabric panel that comprises at least 50% polyester. Moreover, these components may have varying properties and characteristics, which may cause the components to interact with one another in different manners. As such, certain combinations of an ink, sublimation dye, and polyester content of a material may be adjusted to produce a print on a garment with certain characteristics.

One such characteristic is color saturation. In aspects herein, color saturation relates to an intensity of colors in an image. The term "color saturation" is more technically defined by the International Commission on Illumination (Commission internationale de l'éclairage; CIE), the international authority on light, illumination, color, and color spaces. The CIE's definition of "color saturation" is the colorfulness of an area judged in proportion to its brightness. The entirety of the of CIE is incorporated by reference herein, and for explanatory purposes, color saturation is more broadly discussed below.

At a high level, color saturation may refer to an intensity or purity of color in an image. For example, an image with a low color saturation will include visible gray tones and may appear muted, whereas an image with high color saturation will include vibrant colors and no gray tones will be visible. While this generalized explanation of color saturation is relevant to understanding aspects discussed herein, the term "color saturation" shall be considered in a context of an image, print, graphic, and/or visual indicia on a fabric panel or garment, and relate to printed areas of a fabric panel that may have different color saturations.

Notwithstanding, a color saturation of an image involves a visual perception and therefore, measuring color saturation may involve a subjective component and may differ depending on certain conditions. As such, the term "color saturation" as used throughout this description and in the claims refers to a characteristic of color at an area of a fabric panel after application of a sublimation dye and/or an ink layer to a portion of a surface of the fabric panel in accordance with aspects discussed herein. Further, more intense colors may correspond to a higher color saturation, and less intense colors may correspond to a lower color saturation. As such, areas of a fabric panel that have different color intensities may have different color saturations. Additionally, differences in "color saturation" may be defined as a numerical comparison of one or more color saturations that are determined by differences between color saturations of one or more samples to a standard color saturation, which may further be indicated by differences in absolute color coordinates referred to as Delta ($\Delta$).

In further aspects and as understood by those having ordinary skill in the art, a color measurement instrument, such as a spectrophotometer, may be used to measure color saturation of one or more color samples by assigning one or more numerical values, each of which are associated with a characteristic of a color sample and may collectively be used to calculate a differences between color saturation of the one or more samples. As such, it is contemplated that differences between color saturation at different areas on a surface of a printed fabric panel may be evaluated by measuring the color saturation at each of the different areas of the fabric panel with a spectrophotometer, calculating a difference between numerical values associated with the color saturation at each different area with standard numerical values, and then comparing the calculated differences of each different area on the surface of the printed fabric panel with one another.

In one example, a difference in color saturation may be identified using the L*a*b* color space as defined by the CIE. In this example, L* represents lightness/darkness, a* represents a red/green coordinate, and b* represents a yellow/blue coordinate. Moreover, a spectrophotometer may be implemented to measure the L*, a*, and b* values of a standard fabric panel and a sample fabric panel at multiple areas of both fabric panels. The standard fabric panel may be formed of 100% polyester, may be printed with a first sublimated image, and further, a first standard color saturation may correspond to the L*, a*, and b* values at a first standard area of the standard fabric panel, and a second standard color saturation may correspond to the L*, a*, and b* values at a second standard area of the standard fabric panel. Continuing with this example, the sample fabric panel may be formed of at least 50% polyester but less than 100% polyester, may include an ink layer, and may also be printed with the first sublimated image in a manner similar to the sample fabric panel. Additionally, the sample fabric panel may have a first sample area that corresponds to the first standard area of the standard fabric panel, as well as a second sample area that corresponds to the second standard area of the standard fabric panel. Thus, the sample fabric may further include a first sample color saturation that may correspond to the L*, a*, and b* values at the first sample area of the sample fabric panel, and a second sample color saturation that may correspond to the L*, a*, and b* values at a second sample area of the sample fabric panel.

As previously mentioned, a difference between the standard and sample L*, a*, and b* values at the first and second areas, respectively, may be referred to as Delta ($\Delta$), and a comparison of these differences at each area may represent differences in color saturations between the standard fabric panel and the sample fabric panel at their respective first area or their respective second areas. Accordingly, $\Delta L^*$ may be L* of the sample fabric panel minus L* of the standard fabric panel standard, $\Delta a^*$ may be a* of the sample fabric panel minus a* of the standard fabric panel, and $\Delta b^*$ may be b* of the sample fabric panel minus b* of the standard fabric panel. In further aspects $\Delta E^*$ may represent a total difference in color saturation and may be determined by a total difference between $\Delta L^*$, $\Delta a^*$, and $\Delta b^*$ or $\Delta E^*$ may be $[\Delta L^{*2} + \Delta a^{*2} + \Delta b^{*2}]$ divided by ½.

In accordance with these aspects and as understood by those having ordinary skill in the art, a first color saturation may be represented by any one of $\Delta L^*$, $\Delta a^*$, $\Delta b^*$ or $\Delta E^*$ at the first areas of the sample fabric panel and the standard fabric panel. Moreover, a second color saturation may be represented by any one of $\Delta L^*$, $\Delta a^*$, $\Delta b^*$ or $\Delta E^*$ at the second areas of the sample fabric panel and the standard fabric panel. Further, a difference between the first color saturation and the second color saturation may be measured based on a percentage difference between the corresponding $\Delta L^*$, $\Delta a^*$, $\Delta b^*$ or $\Delta E^*$ at the first and second areas, and it is contemplated herein that such a percentage difference may be within the range between κ% and 95%. In aspects, the first color saturation and the second color saturation may differ by 5%, 10%, 15%, or 20%.

Furthermore, as a color saturation may relate to an amount of sublimation dye absorbed at an area of a garment printed in accordance with aspects herein, color saturation may be affected by a polyurethane-based ink, non-polyurethane-based ink, and a polyester content of a material that forms the fabric panel. At a high level and as discussed herein, a sublimation dye has an affinity to polyester and thus, a sublimation dye may produce a more vibrant print on substrates that contain polyester. Further, a sublimation dye may be absorbed by an ink layer formed of polyurethane-based ink and rejected by an ink layer formed by non-polyurethane-based ink. In aspects, a fabric panel having 50% polyester, printed with a polyurethane-based ink in accordance with aspects discussed herein, will have a higher color saturation at the areas printed with polyurethane-based ink than those that were not. Moreover, a fabric panel having 50% polyester, printed with a non-polyurethane-based ink in accordance with aspects discussed herein, will have a lower color saturation at the areas printed with polyurethane-based ink than those that were not.

As can be appreciated from the foregoing, it is contemplated that aspects discussed herein may be implemented in a variety of ways to print a garment. Moreover, these aspects include a material of a fabric panel, an ink layer, a sublimation dye, and their respective application techniques, and further, each of these aspects has numerous components, characteristics, and/or properties that may affect their interaction in differing manners. Such interactions may cause different color saturations, and therefore, these aspects may selectively be employed to adjust one or more characteristics of a print on a garment. Notwithstanding, aspects of the present invention are discussed below in an example fashion with reference to the Figures.

Beginning with FIG. 1, an example garment 1 is depicted, in accordance with aspects hereof. The garment 1 is comprised of a fabric panel 2 having a first surface 4, a first area 10 on the first surface 4, and a second area 20 on the first surface 4. The garment 1, the fabric panel 2, and elements thereof, including the fabric panel 2, the first area 10, and the second area 20, are depicted generically for discussion purposes and may be moved, repositioned, reshaped, duplicated, or reconfigured. Further, it is understood that these depictions are illustrative in nature and are not limiting. For example, the first area 10 is illustrated as an oval, but it is contemplated that the first area 10 may have any shape or may be a graphic, such as a logo.

The garment 1 is depicted as a shirt for illustrative purposes. However, as already discussed, it is contemplated that the garment 1 may be any article such as other articles of apparel, like shorts, jerseys, pants, socks, coats and the like. As shown in FIG. 1, the garment 1 includes the fabric panel 2 that forms a torso portion of the shirt and may be an individual component of the garment 1. Although not shown, the fabric panel 2 may be attached to other individual components of the garment 1 via stitching, bonding, joining, or through adhesives. The fabric panel 2 may be cut from a larger piece of fabric and may have many shapes and sizes that may depend on requirements of an end garment. Moreover, the fabric panel 2 comprises a variety of materials, and in aspects, the fabric panel 2 is comprised of at least 50% polyester.

Figure 2:
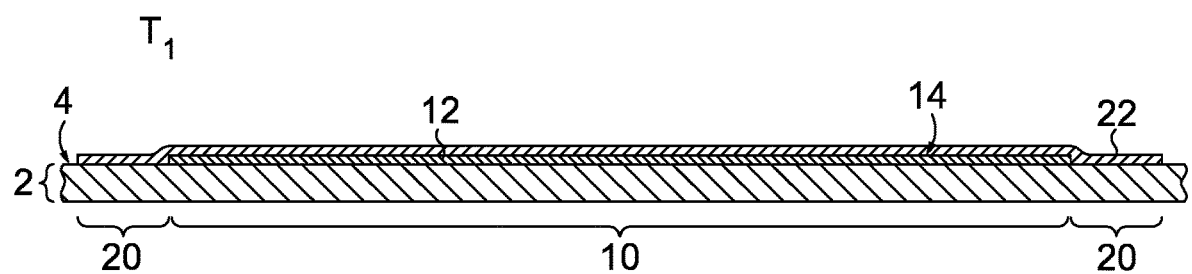
FIG. 2 depicts a cross section view of the garment of FIG. 1 at a first point in time, taken along the plane 2 of FIG. 1, in accordance with an aspect hereof.

Turning now to FIG. 2, a cross section view of the garment 1 taken along the plane 2 of FIG. 1 is depicted. The garment 1 is also comprised of an ink layer 12 with an ink surface 14 distal to the first surface 4, and the ink layer 12 is located at the first area 10 on the first surface 4. The garment 1 is further comprised of a sublimation dye 22 that is located at the first area 10 and the second area 20 of the fabric panel 2. Moreover, at the first area 10, the sublimation dye 22 is on at least the ink surface 14, and at the second area 20, the sublimation dye 22 is absorbed by at least a portion of the fabric panel 2. For illustrative purposes, FIG. 2 depicts an arrangement or configuration of the ink layer 12 and the sublimation dye 22 on the first surface 4 of the fabric panel 2 at $T_1$, which represents a point in time immediately after the sublimation dye 22 has been applied in accordance with methods for printing a garment as described herein. Therefore, it is to be understood that an arrangement of the ink layer 12 and the sublimation dye 22 on the first surface 4 of the fabric panel 2 may be different at an earlier or later point in time.

In other aspects, prior to the point in time depicted in FIG. 2, the ink layer 12 is applied to the first surface 4 of the fabric panel 2 via direct printing and is cured. Although not depicted in FIG. 2, the ink layer 12 may be comprised of a polyurethane-based ink or a non-polyurethane-based ink, either of which may include a color and/or visual component and may also be applied to the first surface 4 of the fabric panel 2 via direct printing. Moreover, while only a single layer of ink is shown, it is contemplated herein, that one or more additional ink layers may be included atop the ink layer 12, which may be comprised of a same or different ink and may be applied via a same or different direct printing technique. Further, when additional ink layers are included, an ink surface 14 may be a surface of an uppermost ink layer that is distal to the first surface 4 of the fabric panel 2.

Figure 3A:
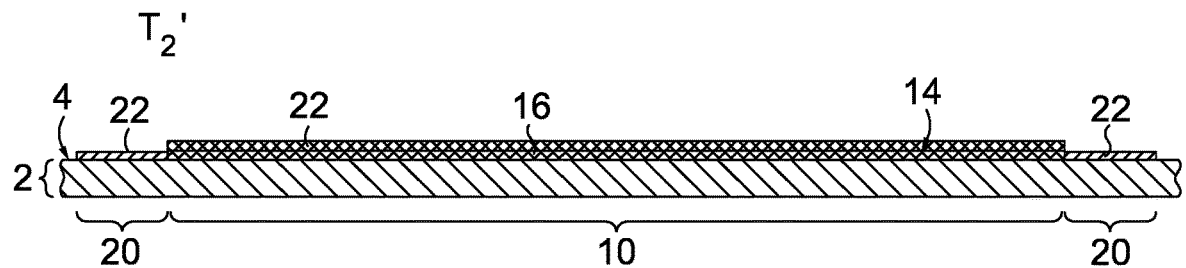
FIG. 3A depicts a cross section view of the garment of FIG. 1 at a second point in time, illustrating application of a polyurethane-based ink, in accordance with an aspect hereof.

With reference now to FIG. 3A, a cross section view of the garment 1 like that of FIG. 2 is depicted, but the garment 1 is shown at a point in time after $T_1$. Moreover, FIG. 3A is designated with $T_2'$, which represents a point in time after application of the sublimation dye 22 but prior to completion of sublimation printing and indicates that an ink layer is formed by a polyurethane-based ink. As illustrated in FIG. 3A, the garment 1 comprises the same components shown in FIGS. 1 and 2, but the ink layer 12 is further depicted as comprising a polyurethane-based ink 16. In addition, the sublimation dye 22 is shown in an illustrative manner that depicts application and an initial absorption of the sublimation dye 22 at the first area 10 and the second area 20 of the fabric panel 2. As can be seen, the sublimation dye 22 is shown as a thin layer atop the first surface 4 of the fabric panel 2 at the second area 20 and is similarly shown atop the ink surface 14 of the ink layer 12 at the first area 10. It is to be understood that these depictions are merely examples and illustrate that the sublimation dye 22 may be applied to and may be visible at the first and second areas 10, 20 on the first surface 4 and the ink surface 14, respectively. Moreover, even if the sublimation dye 22 did not form a definable layer on the first surface 4 and the ink surface 14, it is contemplated herein that the sublimation dye 22 may be absorbed in a manner such that the sublimation dye 22 is still visible at the first and second areas 10, 20.

Continuing with FIG. 3A, the sublimation dye 22 is also shown as being delineated from the fabric panel 2 and the ink layer 12 in order to illustrate a beginning stage of sublimation printing that includes application and initial absorption of the sublimation dye 22. Nevertheless, as the sublimation dye 22 is absorbed, there may not be a clear demarcation between the sublimation dye 22 and the fabric panel 2 or the ink layer 12. Thus, at a later point in time and as discussed in connection with FIG. 3B, the sublimation dye 22 may gradually disperse into or be absorbed by the fabric panel 2 and the ink layer 12 such that a unitary combination is formed by the sublimation dye 22 and the fabric panel 2 and the sublimation dye 22 and the ink layer 12. As such, in these aspects, it is contemplated that no distinction may be made between the sublimation dye 22 and the fabric panel 2 or the ink layer 12.

Figure 3B:
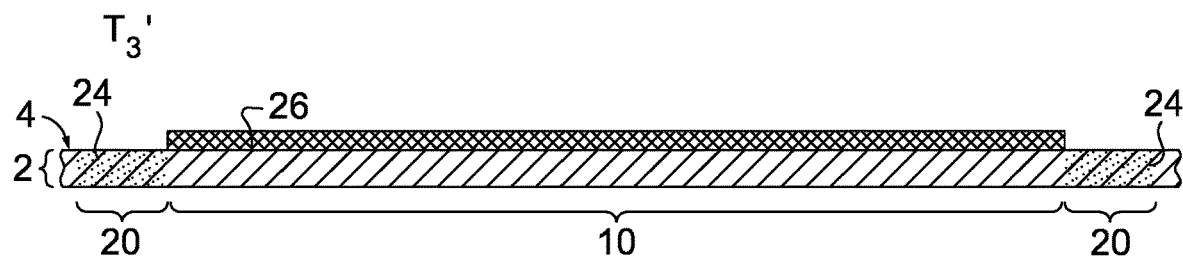
FIG. 3B depicts a cross section view of the garment of FIG. 1 at a third point in time, illustrating application of a polyurethane-based ink, in accordance with an aspect hereof.

Moving now to FIG. 3B, a similar cross section view of the garment 1 like that of FIG. 3A is depicted, but FIG. 3B depicts the garment 1 at point in time after $T_2'$ and illustrates further absorption of the sublimation dye 22. The garment 1 of FIG. 3B includes the same components identified in FIG. 3A, but because FIG. 3B depicts the garment 1 at a later point in time, some of these components are depicted in a differing manner to illustrate further absorption of the sublimation dye 22. Thus, FIG. 3B is designated $T_3'$, and as such, the garment 1 is shown at a point in time after sublimation printing has been completed in accordance with methods of printing a garment discussed herein and indicates that the ink layer 12 was formed by the polyurethane-based ink 16. As can be seen, in some aspects, it is contemplated that there may be no clear distinction or separation between the sublimation dye 22 and the fabric panel 2 or the sublimation dye 22 and the ink layer 12. As such, a dyed fabric 24 is depicted as the fabric panel 2 has absorbed the sublimation dye 22 at the second area 20, and similarly, a dyed ink layer 26 is also depicted as the ink layer 12 formed of the polyurethane-based ink 16 has absorbed the sublimation dye 22 at the first area 10.

With reference now to FIGS. 3A and 3B, during sublimation printing of the garment 1, the sublimation dye 22 is included at the first and second areas 10, 20 in different manners. Initially, the sublimation dye 22 is applied to the first surface 4 of the fabric panel 2 and the ink surface 14 of the ink layer 12 as depicted in FIG. 3A, and subsequently, the sublimation dye 22 is absorbed by the fabric panel 2 and the ink layer 12 as illustrated in FIG. 3B. Accordingly, the sublimation dye 22 at the second area 20 in FIG. 3A may be absorbed by the fabric panel 2 to form the dyed fabric 24 shown in FIG. 3B. Likewise, the sublimation dye 22 at the first area 10 in FIG. 3A may be absorbed by the ink layer 12 to form the dyed ink layer 26 shown in FIG. 3B. As such, both the dyed fabric 24 and the dyed ink layer 26 are portions of the fabric panel 2 and the ink layer 12, respectively, that have absorbed and include the sublimation dye 22. It is contemplated that such absorption may occur upon application of heat, pressure, and/or energy to the fabric panel 2 and the sublimation dye 22 as previously discussed in connection with aspects related to sublimation printing.

Figure 3C:
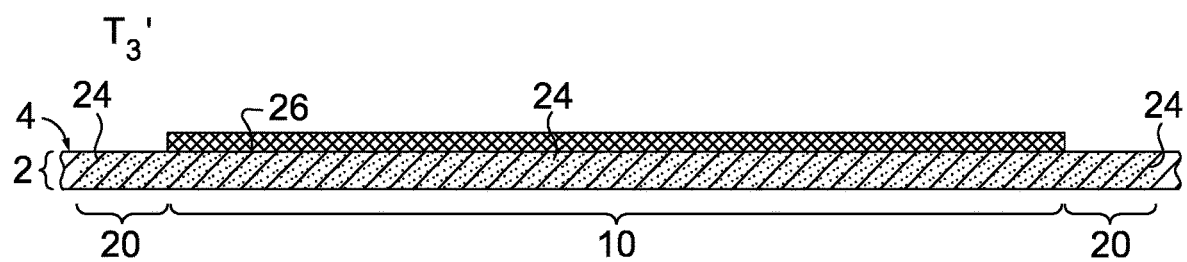
FIG. 3C depicts a cross section view of the garment of FIG. 1 at an alternative third point in time, illustrating application of a polyurethane-based ink, in accordance with an aspect hereof.

With additional reference to FIG. 3C, which shows a similar cross section view of the garment 1 like that of FIG. 3A, at a same point in time as FIG. 3B and with the same components (FIG. 3C shares the same designation as FIG. 3B, $T_3'$), it is contemplated herein that the sublimation dye 22 may be absorbed at the first area 10 in varying manners. As can be seen in FIGS. 3A and 3B, at the first area 10, the sublimation dye 22 may only be absorbed by the ink layer 12 to form the dyed ink layer 26, or as shown in FIG. 3C, the sublimation dye 22 may be absorbed by the ink layer 12 and also the fabric panel 2. Thus, the dyed fabric 24 may be included at the first area 10 with the dyed ink layer 26. Although not depicted, the sublimation dye 22 may be absorbed at the first area 10 in an amount that is between or less than those shown in FIGS. 3A and 3B. For example, the sublimation dye 22 may be absorbed throughout the ink layer 12 but may only be partially absorbed by the fabric panel 2, or the sublimation dye 22 may only be absorbed by a portion of the ink layer 12. Aspects related to absorption of the sublimation dye 22 at the first area 10 may depend on a polyurethane content of the polyurethane-based ink 16, an amount of polyester contained in the fabric panel 2, or a composition of the sublimation dye 22 and a manner in which it is applied.

Figure 4A:
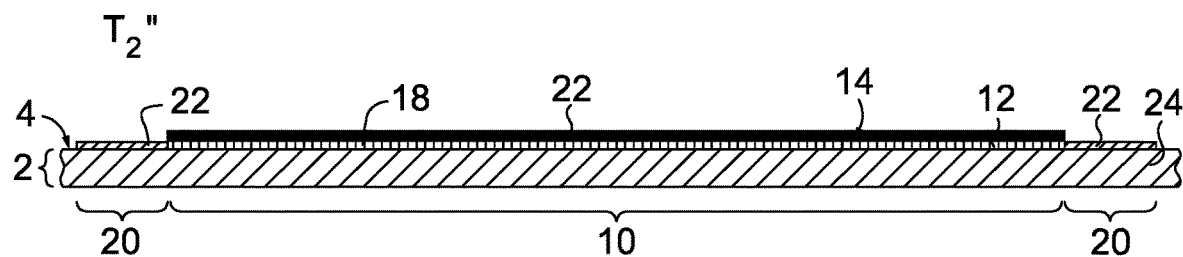
FIG. 4A depicts a cross section view of the garment of FIG. 1 at a second point in time, illustrating application of a non-polyurethane-based ink, in accordance with an aspect hereof.

Moving now to FIG. 4A, a cross section view of the garment 1 like that of FIG. 2 is depicted, but the garment 1 is shown at a point in time after $T_1$. Further, FIG. 4A is designated with $T_2''$, which represents a point in time immediately after the sublimation dye 22 has been applied in accordance with methods for printing a garment as described herein and also indicates that an ink layer is formed by a non-polyurethane-based ink. FIG. 4A depicts the garment 1 as having the same components shown in FIGS. 1 and 2, but the ink layer 12 is further depicted as comprising a non-polyurethane-based ink 18. Moreover, any aspects discussed in connection with FIG. 3A are included in and applicable to FIG. 4A except for aspects related to the ink layer 12 and a configuration of the fabric panel 2, the ink layer 12, and the sublimation dye 22 at the first area 10. As such, discussions of aspects illustrated in FIG. 4A will only include those that are not illustrated in FIGS. 1, 2, and 3A and have not previously been described herein.

An application of the sublimation dye 22 as shown in FIG. 4A is illustratively depicted in a likewise manner to FIG. 3A. At the first area 10, the fabric panel 2 includes the ink layer 12 containing the non-polyurethane-based ink 18 and the sublimation dye 22 on at least a portion of the ink surface 14. The sublimation dye 22 is again shown as a thin layer atop the ink surface 14 of the ink layer 12 at the first area 10, and it is to be understood that these depictions are merely examples and illustrate that the sublimation dye 22 may be applied to and may be visible at the first area 10 on the ink surface 14. It is also understood that even without a definable layer, the sublimation dye 22 may be included in the fabric panel 2 in a manner such that the sublimation dye 22 is still visible.

Continuing with FIG. 4A, the sublimation dye 22 is also shown as being delineated from the fabric panel 2 and the ink layer 12 in order to illustrate a beginning stage of sublimation printing that includes application and initial absorption of the sublimation dye 22. The non-polyurethane-based ink 18 may prevent absorption of the sublimation dye 22 by the ink layer 12, and thus, at the first area 10, the sublimation dye 22 and the ink layer 12 may continue to be distinguishable even after completion of sublimation printing. As such, the sublimation dye 22 may adhere to and be positioned on at least the ink surface 14. Further, it is contemplated that the sublimation dye 22 and the ink layer 12 may be configured such that the sublimation dye 22 is positioned on at least the ink surface 14 and is partially absorbed by a portion of the ink layer 12.

Figure 4B:
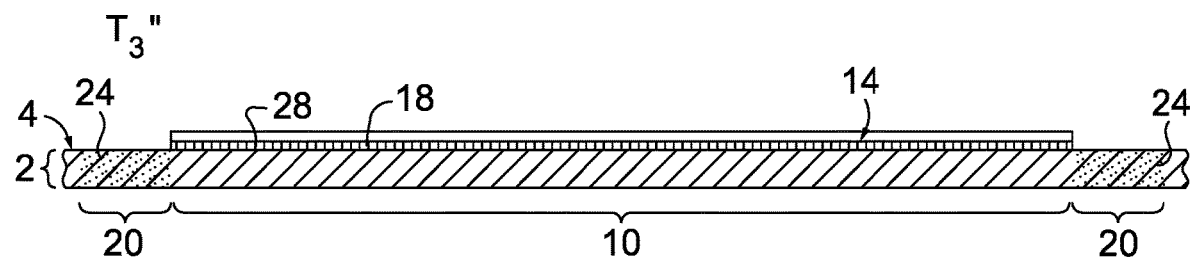
FIG. 4B depicts a cross section view of the garment of FIG. 1 at a third point in time, illustrating application of a non-polyurethane-based ink, in accordance with an aspect hereof.

Turning now to FIG. 4B, a similar cross section view of the garment 1 like that of FIG. 4A is depicted, but FIG. 4B depicts the garment 1 at point in time after $T_2''$ and illustrates further absorption of the sublimation dye 22 at the second area 20. The garment 1 of FIG. 4B includes the same components identified in FIG. 4A, but because FIG. 4B depicts the garment 1 at a later point in time, some of these components are depicted in a differing manner to illustrate changes in how the sublimation dye 22 is included in the fabric panel 2. Accordingly, FIG. 4B is designated $T_3''$, and as such, the garment 1 is shown at a point in time after sublimation printing has been completed in accordance with methods of printing a garment discussed herein. Moreover, FIG. 4B depicts the garment 1 as having the same components shown in FIGS. 1 and 2, but like FIG. 4A, the ink layer 12 is further depicted as comprising the non-polyurethane-based ink 18. In addition, many aspects discussed in connection with FIG. 4A are included in and applicable to FIG. 4B, and as such, discussions of aspects illustrated in FIG. 4B will only include those that are not illustrated in FIGS. 1, 2, and 4B and have not previously been described herein.

As can be seen in FIG. 4B, in some aspects, it is contemplated that the non-polyurethane-based ink 18 prevents absorption of the sublimation dye 22 by the ink layer 12, resulting in a distinguishable separation between the sublimation dye 22 and the ink layer 12. As such, the sublimation dye 22 is on at least the ink surface 14 of the ink layer 12 containing the non-polyurethane-based ink 18 and forms a sublimation dye layer 28 at the first area 10. In a differing manner, there may be no clear distinction or separation between the sublimation dye 22 and the fabric panel 2 at the second area 20, and as such, a dyed fabric 24 is depicted as the fabric panel 2 has absorbed the sublimation dye 22 at the second area 20. Accordingly, FIG. 4B depicts an example arrangement of the fabric panel 2, the ink layer 12, and the sublimation dye 22 after sublimation printing has been completed in accordance with these aspects in an illustrative manner.

With reference now to FIGS. 4A and 4B, throughout sublimation printing of the garment 1, the sublimation dye 22 is included at the first and second areas 10, 20 in different manners. Initially, the sublimation dye 22 is applied to the first surface 4 of the fabric panel 2 and the ink surface 14 of the ink layer 12 as depicted in FIG. 4A, and at a later point in time, the sublimation dye 22 is absorbed by the fabric panel 2 but is retained at the ink surface 14 of the ink layer 12 as illustrated in FIG. 4B. Accordingly, the sublimation dye 22 at the second area 20 in FIG. 4A may be absorbed by the fabric panel 2 to form the dyed fabric 24 shown in FIG. 4B, and at the first area 10 the sublimation dye 22 is on at least a portion of the ink surface 14 forming the sublimation dye layer 28 shown in FIG. 4B. As such, both the dyed fabric 24 and the sublimation dye layer 28 correspond to portions of the fabric panel 2 and the ink layer 12 that were subject to application of the sublimation dye 22 in FIG. 4A. As previously discussed in aspects related to sublimation printing, it is contemplated that differences between FIGS. 4A and 4B may be caused by application of heat, pressure, and/or energy to the fabric panel 2 and the sublimation dye 22.

In accordance with aspects herein, FIGS. 2 and 3A-4B illustrate example configurations of a fabric panel, an ink layer, and a sublimation dye that may be utilized to print a garment with a high quality graphic or design. Moreover, it is contemplated that these configurations may be altered or modified to control other characteristics of a printed garment, and as such, aspects are not limited to or by any example discussions or descriptions herein. Notwithstanding, aspects related to utilizing these illustrative configurations to control color saturation at different printed areas of a garment are discussed in the following.

FIG. 5 shows a top view of the garment 1 of FIG. 1. The garment 1 includes the same components and aspects shown in or discussed in connection with FIGS. 1 and 2, but the garment 1 is depicted after printing has been completed in accordance with methods of printing a garment discussed herein. Thus, the garment 1 comprises the fabric panel 2 made of at least 50% polyester that has the first surface 4, the first area 10, and the second area 20, and although not identified in FIG. 5, the garment 1 also includes an ink layer at the first area 10 and a sublimation dye at the second area 20 and on at least a portion of an ink surface at the first area 10. In addition, the fabric panel 2, an ink layer, and a sublimation dye may be included in the garment 1 in any of the example configurations previously described herein and/or illustrated in FIGS. 3B, 3C, and 4B.

The garment 1 of FIG. 5 is depicted to illustrate aspects related to color saturation at the first area 10 and the second area 20. As shown, the fabric panel 2 of the garment 1 may have a first color saturation 31 at the first area 10 and a second color saturation 32 at the second area 20. As discussed herein, color saturation relates to a pureness, vibrancy, or intensity of colors in an image, may be measured as discussed herein, and may relate to an amount of sublimation dye absorbed by a substrate. Accordingly, various configurations of the fabric panel 2 and an ink layer may affect an amount of sublimation dye that may be absorbed at a given area of a fabric panel, and thus, an area of the fabric panel that includes the ink layer will absorb a different amount of sublimation dye than an area of the fabric panel that does not include the ink layer.

Continuing with these aspects and as shown in FIG. 5, the first color saturation 31 and the second color saturation 32 are different, which is, at least in part, because the first area 10 includes an ink layer and the second area 20 does not. Moreover, a polyester content of the fabric panel 2 may also impact the first color saturation 31 and the second color saturation 32. For instance, as a polyester content of the fabric panel 2 increases, more of the sublimation dye may be absorbed by the fabric panel 2 and in turn, a color saturation at areas of the fabric panel 2 that absorbed more of the sublimation dye may increase. In aspects, the first color saturation 31 may be higher than the second color saturation 32 when an ink layer at the first area 10 is formed of a polyurethane-based ink, and conversely, the first color saturation 31 may be less than the second color saturation 32 when an ink layer at the first area 10 is formed of a non-polyurethane-based ink. In such aspects, it is contemplated that the first color saturation 31 and the second color saturation 32 may visually contrast to form an image, and it is further contemplated that a difference in color saturation between the first area 10 and the second area 20 may be in a range from 5%-95%.

Although depicted in an example manner in FIGS. 1-5, aspects herein contemplate applying an ink layer and a sublimation dye to a fabric panel to produce a print with an improved aesthetic quality. In such aspects, a print may include an image, graphic, design or visual indicia and may be formed by visual and/or color components of an ink layer, a sublimation dye, or both. Additionally, a print or portions of a print may be highlighted, enhanced or improved by utilizing an ink, a sublimation dye, and a fabric panel with certain characteristics that cause areas of the print to visually contrast. For example, a print on a fabric panel of at least 50% polyester formed by a polyurethane-based ink and a sublimation dye may have improved aesthetic qualities at areas where the sublimation dye overlaps the polyurethane-based ink. As discussed herein, an aesthetic quality of the print may be improved as a greater amount of the sublimation dye may be absorbed by the polyurethane-based ink than the fabric panel, and in turn, a color saturation of the print is higher at an area that includes the polyurethane-based ink. Comparatively, a print on a fabric panel of at least 50% polyester formed by a non-polyurethane-based ink and a sublimation dye may have improved aesthetic qualities at areas where the non-polyurethane-based ink is absent. Accordingly, an aesthetic quality may be improved as a greater amount of the sublimation dye may be absorbed by the fabric panel than the non-polyurethane-based ink, and therefore, a color saturation of the print is higher at an area that excludes the non-polyurethane-based ink.

In FIG. 6, a method 200 for printing a garment 1 is illustrated. To aid in explanation, the method 200 will be described with general reference to aspects of the garment 1 previously described in FIGS. 1-5. As shown in FIG. 6, the method 200 begins with a first step 201 of providing the fabric panel 2 that may be at least 50% polyester and have a first surface 4, a first area and a different second area. A second step 202 includes applying an ink layer 12 to the first area of the first surface of the fabric panel 2 and is followed by a third step 203, in which the ink layer 12 applied to the fabric panel 2 is cured. After curing, a fourth step 204 includes applying a sublimation dye 22 to the second area of the first surface and a surface on the ink layer 12 positioned distal to the fabric panel 2, which may be located at the first area. Once application of the sublimation dye is complete, the fabric panel 2 has a first color saturation 31 at the first area 10 and a different second color saturation 32 at the second area 20. At a fifth step 205, the fabric panel 2 may then be used to construct a garment 1. After completion of these steps, the garment 1 has been printed and includes the first color saturation 31 at the first area 10 and the second color saturation 32 at the second area 20.

Figure 7:
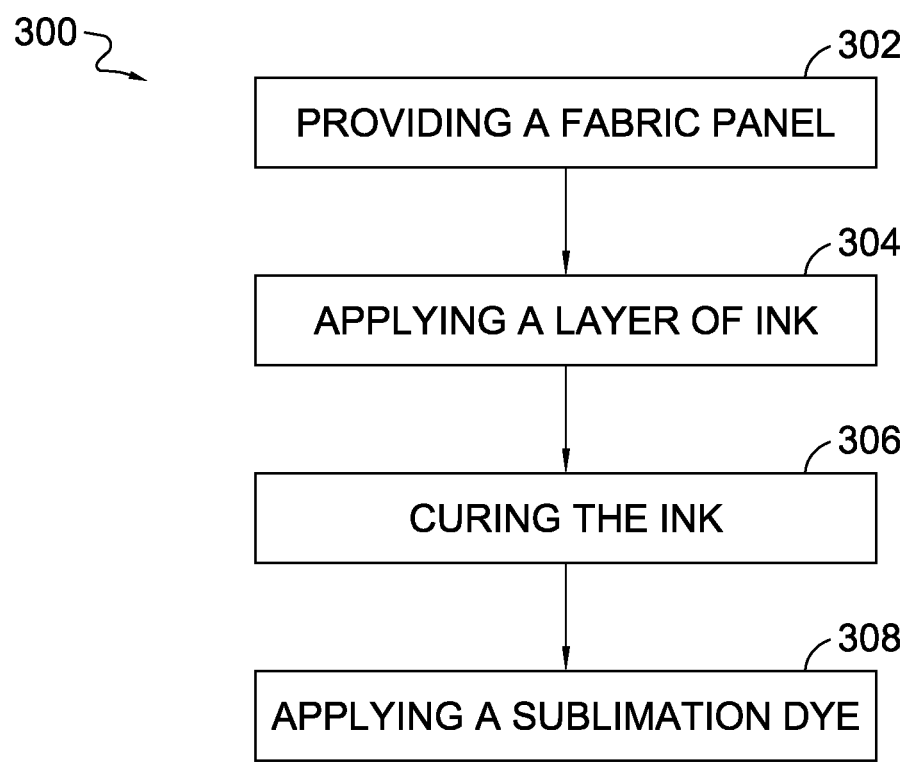
FIG. 7 depicts a flow diagram of an example method of printing a garment, in accordance with an aspect hereof.

FIG. 7 depicts a flow diagram 300 representing a method for printing a garment in accordance with aspects hereof. To aid in explanation, the flow diagram 300 will be described with general reference to aspects of the garment 1 previously described in FIGS. 1-5. At a block 302 a fabric panel is provided. The fabric panel may include at least 50% polyester and have a first surface with a first area and a second area. Next and as depicted at a block 304, a layer of ink is applied to the first area of the first surface by direct printing. In accordance with aspects herein, it is contemplated that a layer of ink may be formed of a polyurethane-based ink or a non-polyurethane-based ink, and it is further contemplated that direct printing may include any of the aspects related to direct printing techniques and methods discussed herein. Moreover, a step depicted at the block 304 may be repeated such that additional layers of ink may be included at the first area of the first surface. Once application of the one or more layers of ink has been completed, the one or more layers of ink may be cured, which is depicted at a block 306. As discussed herein, curing may include conventional techniques known to those having ordinary skill in the art. Subsequent to curing the one or more layers of ink and as illustrated by a block 308, a sublimation dye is applied to the second area of the first surface and a surface of the one or more ink layers positioned distal to the fabric panel. At the block 308, it is contemplated that the sublimation dye may include those discussed previously and may be applied via sublimation printing in accordance with aspects herein. As such, application of the sublimation dye causes the first area to have a first color saturation and the second area to have a different second color saturation. Upon completion of a step at the block 308, the fabric panel may be used to construct a garment in accordance with aspects herein.

As previously discussed, it is contemplated that aspects herein may be implemented at applicable steps depicted by the flow diagram 300 to create a print on a fabric panel with certain characteristics. Such aspects may include applying an ink layer and a sublimation dye in a manner that forms an image, graphic, design, or visual indicia on a surface of a fabric panel. Moreover, one or more areas of the fabric panel may have different color saturations that visually contrast to form a graphic. Further, these aspects, as well as other aspects, may be implemented to improve an aesthetic quality of a print on a fabric panel of at least 50% polyester.

It will be understood that certain features and subcombinations are of utility and may be employed without reference to other features and subcombinations. This is contemplated by and is within the scope of the claims.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

The invention claimed is:

1. A garment comprising:
a fabric panel comprised of at least 50% polyester and having a first surface, a first area on the first surface and, a second area on the first surface;
an ink layer located at the first area on the first surface, the ink layer having an ink surface distal to the fabric panel on the first surface; and
a sublimation dye located at the first area and the second area of the fabric panel, wherein the sublimation dye is absorbed by at least a portion of the fabric panel at the second area and is on at least the ink surface at the first area.

2. The garment of claim 1 further comprising two or more ink layers located at the first area, the two or more ink layers having an ink surface distal to the fabric panel on the first surface.

3. The garment of claim 1, wherein the fabric panel further comprises a first color saturation at the first area and a second color saturation at the second area that is different than the first color saturation.

4. The garment of claim 3, wherein the ink layer comprises a polyurethane-based ink.

5. The garment of claim 3, wherein the ink layer comprises a non-polyurethane-based ink.

6. A method of printing a garment, the method comprising:
providing a fabric panel comprising at least 50% polyester and having a first surface comprising a first area and a different second area;
applying an ink layer of polyurethane-based ink to the first area of the first surface, the ink layer of polyurethane-based ink applied by direct printing;
curing the ink layer of polyurethane-based ink; and
subsequent to curing the ink layer of polyurethane-based ink, applying a sublimation dye to:
(1) the second area of the first surface, and
(2) a surface of the ink layer of polyurethane-based ink positioned distal to the fabric panel,
wherein applying the sublimation dye causes the first area to have a first color saturation and the second area to have a different second color saturation.

7. The method of claim 6, wherein the first color saturation is greater than the second color saturation.

8. The method of claim 6, wherein the sublimation dye is applied by sublimation printing.

9. The method of claim 6, wherein the ink layer of polyurethane-based ink comprises a clear visual component.

10. The method of claim 9, wherein the sublimation dye comprises one or more color components.

11. The method of claim 10, wherein the ink layer of polyurethane-based ink forms a graphic at the first area having the first color saturation.

12. The method of claim 10, wherein at least a 10% color saturation difference between the first area and the second area causes a visual contrast, and wherein the visual contrast forms a graphic.

13. A method of printing a garment, the method comprising:
providing a fabric panel comprising at least 50% polyester and having a first surface comprising a first area and a different second area;
applying an ink layer of non-polyurethane-based ink to the first area of the first surface, the ink layer of non-polyurethane-based ink applied by direct printing;
curing the ink layer of non-polyurethane-based ink; and
subsequent to curing the ink layer of non-polyurethane-based ink, applying a sublimation dye to:
(1) the second area of the first surface, and
(2) a surface of the ink layer of non-polyurethane-based ink positioned distal to the fabric panel,
wherein applying the sublimation dye causes the first area to have a first color saturation and the second area to have a different second color saturation.

14. The method of claim 13, wherein the first color saturation is less than the second color saturation.

15. The method of claim 13, wherein the sublimation dye is applied by sublimation printing.

16. The method of claim 13, wherein the fabric panel comprises at least 75% polyester.

17. The method of claim 16, wherein the ink layer of non-polyurethane-based ink comprises a white color component.

18. The method of claim 17, wherein the sublimation dye comprises one or more color components.

19. The method of claim 18, wherein the ink layer of non-polyurethane-based ink forms a graphic at the first area having the first color saturation.

20. The method of claim 18, wherein at least a 10% color saturation difference between the first area and the second area causes a visual contrast, and wherein the visual contrast forms a graphic.

* * * * *

UNITED STATES PATENT AND TRADEMARK OFFICE
CERTIFICATE OF CORRECTION

Page 1 of 1

PATENT NO. : 10,549,564 B2
APPLICATION NO. : 15/990930
DATED : February 4, 2020
INVENTOR(S) : Louie LaBonte, Scott Mon and Tiffany Peterson It is certified that error appears in the above-identified patent and that said Letters Patent is hereby corrected as shown below:

In the Specification
Column 11, Line 65: delete "(A)" and replace with --(Δ)--.
Column 12, Line 23: delete "κ%" and replace with --5%--.

Signed and Sealed this
Fourteenth Day of July, 2020

Andrei Iancu
*Director of the United States Patent and Trademark Office*